Sept. 8, 1970  G. D. ROE ETAL  3,527,942
AUTOMATIC SAMPLE CHANGER FOR POSITIONING A PLURALITY
OF PELLETS IN AN X-RAY ANALYZER
Filed Nov. 9, 1967  2 Sheets-Sheet 1
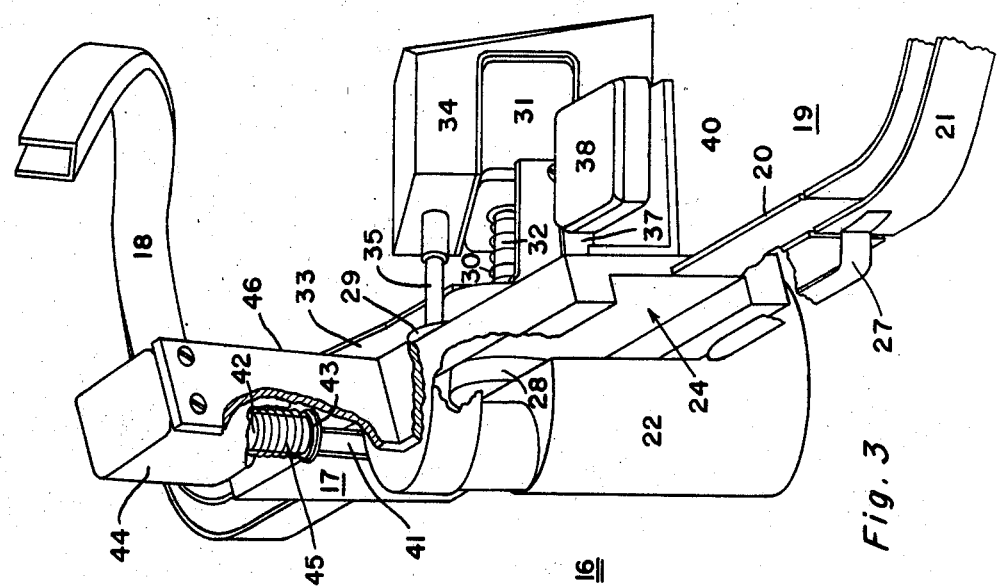
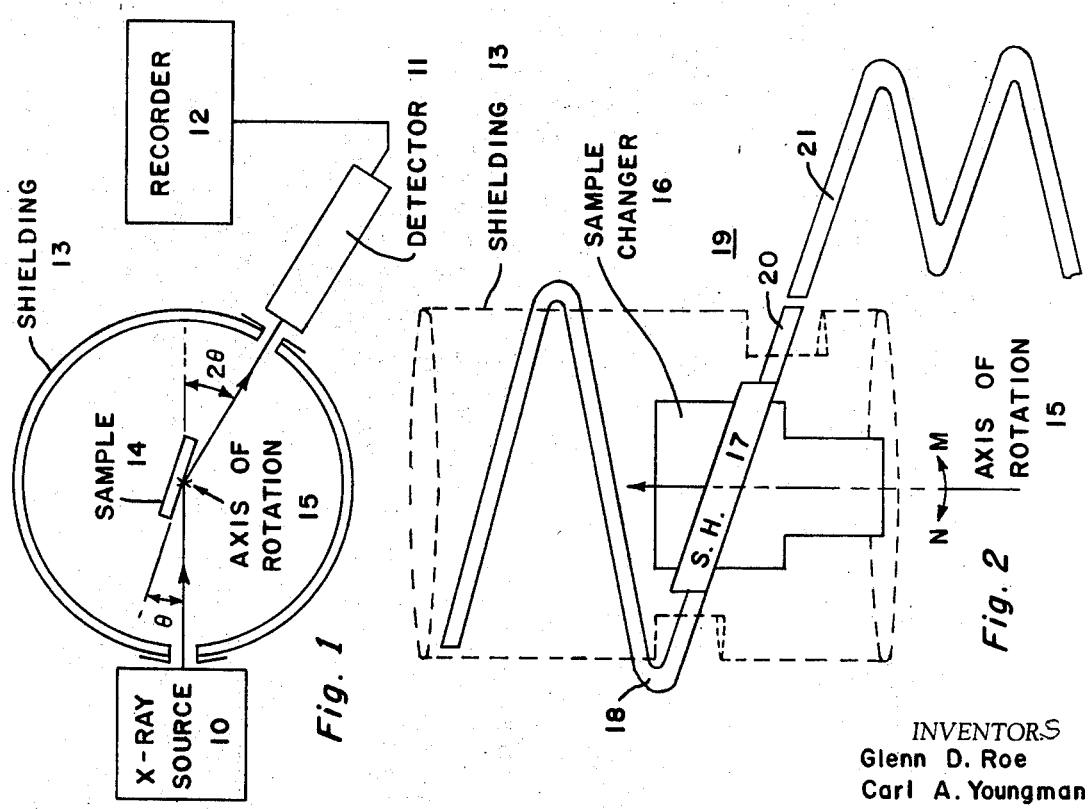
INVENTORS
Glenn D. Roe
Carl A. Youngman
BY
*B. lucher S. Tharp*
Attorney Sept. 8, 1970   G. D. ROE ETAL   3,527,942
AUTOMATIC SAMPLE CHANGER FOR POSITIONING A PLURALITY
OF PELLETS IN AN X-RAY ANALYZER
Filed Nov. 9, 1967   2 Sheets-Sheet 2
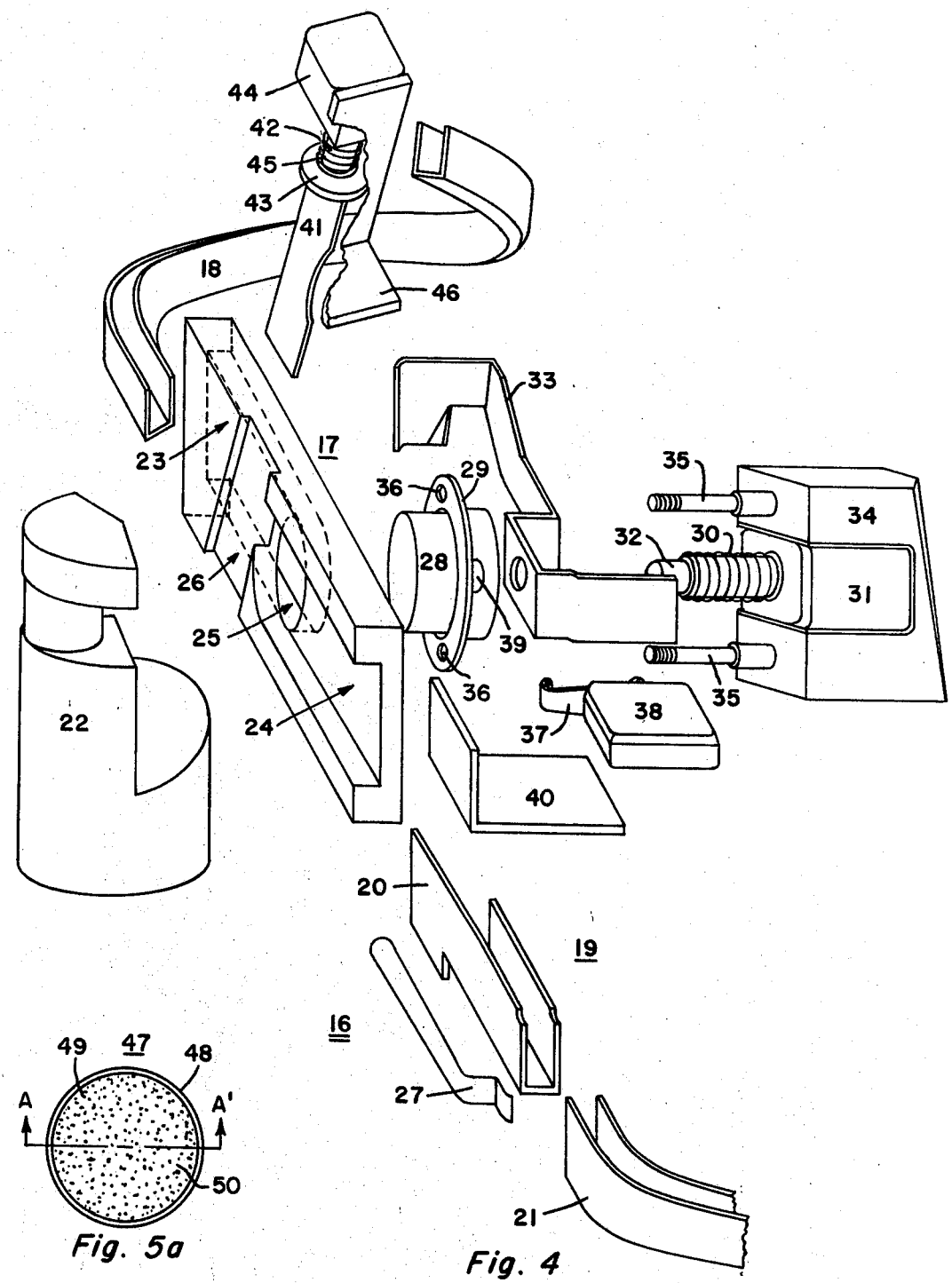
Fig. 5a
Fig. 5b
Fig. 4
INVENTORS
Glenn D. Roe
Carl A. Youngman
BY 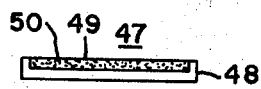
Attorney

United States Patent Office 3,527,942
Patented Sept. 8, 1970

3,527,942
AUTOMATIC SAMPLE CHANGER FOR POSITION-ING A PLURALITY OF PELLETS IN AN X-RAY ANALYZER
Glenn D. Roe and Carl A. Youngman, Dallas, Tex., assignors to The Atlantic Richfield Company, Philadelphia, Pa., a corporation of Pennsylvania
Filed Nov. 9, 1967, Ser. No. 681,712
Int. Cl. G01n 23/20
U.S. Cl. 250—51.5               8 Claims

ABSTRACT OF THE DISCLOSURE

An automatic sample changer for positioning each of a plurality of pellets in predetermined relation to an X-ray or like analyzer. The pellets are loaded on an inclined ramp which leads to a sample holder supported relative to the analyzer by rotatable base means. A piston cooperates with the sample holder to center each pellet on the axis of rotation of the base means. A spring-loaded solenoid periodically operates the piston to introduce new pellets while analyzed pellets are discharged into an exit ramp.

BACKGROUND OF THE INVENTION

The invention generally relates to material or article handling and particularly concerns a sample changer for an X-ray diffractometer.

The X-ray powder method is used for the identification of substances and for other types of analyses. In essence, a small collimated beam of nearly monochromatic X-rays is directed onto a polycrystalline specimen in the form of powder, producing a diffraction pattern that is recorded on film or with a counter tube. This X-ray pattern is a uniquely characteristic property resulting from the atomic arrangement of the diffracting substance. Different substances have different atomic arrangements or crystal structures; hence, no two chemically distinct substances give identical diffraction patterns.

The X-ray powder method is widely used in fundamental and applied research. It has found application in the analysis of raw materials and finished products, in phase diagram investigations, in following the course of solid-state chemical reactions, and in the study of minerals, ores, rocks, metals, chemicals, and many other types of material.

Complete equipment for conducting X-ray analysis is available from several companies; however, applicants are unaware of any sort of automatic sample changer specially adapted for use with modern X-ray diffraction equipment. Technicians conducting routine X-ray analyses have no choice but to change each sample by hand. When a large number of samples are to be analyzed, such manual manipulations are time-consuming, troublesome, and costly.

Accordingly, there is a strong and urgent need for an automatic sample changer which can make unattended analyses of multiple samples. The sample changer must be reliable, trouble-free, and should have a mechanism which positions and aligns each sample for analysis and replaces the analyzed sample with a new sample at the conclusion of each analysis.

SUMMARY OF THE INVENTION

The invention provides an automatic sample changer for use in conjunction with X-ray and other radiant energy analyzers or test equipment.

Basically, the sample changer is comprised of a sample holder, rotatable base means, an inclined loading ramp, a piston, a spring-loaded solenoid, and an inclined exit ramp.

Samples of the materials of interest are prepared as pellets and placed in the loading ramp. The loading ramp is designed to feed one pellet at a time to the sample holder where the individual pellets are held while they are being analyzed. The rotatable base means supports the sample holder relative to the analyzer. The piston is adapted to cooperate with the sample holder to align the pellets so that each pellet in turn is centered on the axis of rotation of the base means. The spring-loaded solenoid is adapted to periodically operate the piston to introduce new pellets into the sample holder. The exit ramp is designed to receive pellets as they are discharged from the sample holder.

The sample holder has first and second grooves formed therein interconnected by a chamber such that the grooves and the chamber are adapted to accommodate the pellets. The loading ramp is in the form of a spiral chute connecting to the first groove and the exit ramp connects to the second groove. The piston is designed to penetrate into the chamber and hold the pellets against the base means which has a flat surface facing the chamber for this purpose. The solenoid functions to withdraw the piston from the chamber after each analysis is concluded so that a new pellet can be introduced into the chamber. An arm actuated by the solenoid can be used to control the introduction of pellets to the sample holder. Also, reject means and a second spring-loaded solenoid can be included to aid in discharging the analyzed pellets from the sample holder. Also, a switch is included to turn the sample changer off after all the pellets have been analyzed.

Applicants have found that their sample changer fully satisfied all the above-noted requirements and can handle sixty or more sample pellets at a time without jamming or damaging the pellets. Moreover, samples used in this device are of a form that both diffraction and spectroscopic analyses can be run on the same pellet.

To the best of applicants' knowledge, automatic sample changing equipment of this type is not available on the market and would fulfill a long felt need.

BRIEF DESCRIPTION OF THE DRAWINGS

FIG. 1 is a schematic representation showing an X-ray diffractometer.

FIG. 2 is a schematic drawing showing the general construction of applicants' sample changer.

FIG. 3 is a pictorial drawing showing the detailed construction of applicants' sample changer.

FIG. 4 is an exploded view (not to scale) of the sample changer shown in FIG. 3.

FIG. 5a shows a sample pellet which applicants designed for use in their sample changer.

FIG. 5b is a cross-sectional view of FIG. 5a taken along A–A'.

DESCRIPTION OF THE PREFERRED EMBODIMENT

Applicants originally developed their novel sample changer for use with an X-ray diffractometer of the type shown in FIG. 1. The basic components of the diffractometer include X-ray source 10, counter or detector 11, recorder 12, and X-ray shielding 13. Specimen or sample 14 is prepared in pellet form and centered on axis of rotation 15 where it is exposed to the X-ray beam generated by source 10. During the analysis, sample 14 is rotated through a predetermined angle about axis 15 while detector 11 is aligned so that it always points toward the diffracted X-ray beam. If $\theta$ is the angle the face of sample 14 makes with the incident X-ray beam, detector 11 must be aligned at an angle of $2\theta$. It follows that detector 11 must arcuately move about axis 15 at twice the angular speed of sample 14 to maintain proper alignment. Since the sample fragments or grains are randomly oriented, a certain number will always be in position such that Bragg's law is satisfied. The defracted beams which flash out as sample 14 rotates through the appropriate Bragg angles are detected by detector 11 and recorded by recorder 12 line by line.

The general construction and mode of operation of applicants' sample changer is disclosed in FIG. 2. Sample changer 16 includes sample holder 17 and has upwardly extending member or loading ramp 18 and downwardly extending member or exit ramp 19. Loading and exit ramps 18 and 19 are inclined so that they act as gravity feed mechanisms to carry the sample pellets to and away from sample holder 17, respectively. Preferably, loading ramp 18 is spirally mounted around the outside of shielding 13 as indicated. Both sample changer 16 and shielding 13 rotate about axis of rotation 15 back and forth between positions M and N.

In operation, a first pellet is introduced into sample holder 17 and sample changer 16 rotates sample holder 17 clockwise from position M to position N so that the first pellet is turned through a predetermined angle. At position N the first pellet is discharged and a second pellet is introduced into sample holder 17. Sample changer 16 now rotates sample holder 17 counterclockwise from position N to position M. As the second pellet is discharged, a third pellet is introduced into sample holder 17 and the above process is repeated so long as there are pellets in loading ramp 18.

It will be seen that exit ramp 19 is in two parts, i.e. sections 20 and 21. Exit ramp section 20 is attached to and rotates with sample holder 17; however, exit ramp section 21 is unattached and remains stationary. Assume that exit ramp sections 20 and 21 connect with each other when sample holder 17 is in position M but that section 20 moves away so that they do not connect when sample holder 17 is in position N. If, then, a first pellet is introduced into sample holder 17 at position M, it will be discharged into section 20 at position N. Thus, section 20 acts as temporary storage means and holds the first pellet until sample holder 17 has rotated back to position M where it is discharged into section 21. If a second pellet was introduced into sample holder 17 at position N, it too is discharged at position M and passes immediately from section 20 to section 21. Obviously, section 21 should have a capacity great enough to contain all the pellets loaded into ramp 18.

The preferred embodiment of sample changer 16 is shown in FIGS. 3 and 4. Sample holder 17 is supported by sample changer post or base means 22 and has grooves 23 and 24 interconnected by chamber 25. Sample holder 17 also has groove 26 which is perpendicular to and intersects groove 24. Loading ramp 18 connects with groove 23 and section 20 of exit ramp 19 connects with groove 24. Exit ramp section 20 fits against exit ramp section 21 aided by spring means 27. Piston 28 is slidably mounted in chamber 25 and passes or penetrates into chamber 25 guided by piston retainer 29. Spring means 30 normally holds piston 28 in place in chamber 25. Solenoid 31 is connected to piston 28 by plunger 32 and withdraws piston 28 from chamber 25 when energized. Arm 33 is mounted on plunger 32 so that it extends between loading ramp 18 and groove 23 when piston 28 is in chamber 25. Solenoid support 34 is attached to sample holder 17 by means of posts 35 which pass through apertures 36 in piston retainer 29. Arm 37 of microswitch 38 extends through aperture 39 and rides on piston 28. Microswitch 38 is supported by bracket 40 which attaches to sample holder 17. Sample rejector 41 is slidably mounted in groove 26 and is forced downward by spring means 42 until it is stopped by rejector retainer 43. Solenoid 44 is connected to sample rejector 41 by plunger 45 and pulls sample rejector 41 upward when energized so as to partially withdraw it from groove 26. Solenoid 44 is supported by bracket 46 which attaches to sample holder 17.

In operation, the sample pellets to be tested are loaded into loading ramp 18, one of which moves into groove 23 of sample holder 17. Automatic operations are commenced by energizing solenoid 31 so that plunger 32 actuates arm 33 and causes piston 28 to withdraw from chamber 25. The pellet in groove 23 rolls and/or slides to chamber 25. At the same time, arm 33 closes loading ramp 18 in order to keep other pellets from entering groove 23. When solenoid 31 is de-energized, spring means 30 returns piston 28 to chamber 25 engaging the first pellet. Piston 28 aligns the first pellet for analysis by pushing it through chamber 25 and holding it against base means 22. At this time, arm 33 opens loading ramp 18 and allows a second pellet to enter groove 23 and contact the side of piston 28. When the analysis is concluded, solenoid 31 is energized which in turn actuates arm 33 and causes piston 28 to again withdraw from chamber 25. Meanwhile, solenoid 44 is energized so that sample rejector 41 moves upward in groove 26 and strikes the first pellet sending it down groove 24 to exit ramp section 20. Solenoid 44 is de-energized and spring means 42 returns sample rejector 41 to its normal position. When solenoid 31 was energized the second time, the second pellet moved immediately into chamber 25 as piston 28 was withdrawn. Once again, spring means 30 forces piston 28 back into chamber 25 where it engages the second pellet and pushes it against base means 22. The second pellet is analyzed and rejected from sample holder 17 repeating the sequence of operations. (As explained in connection with FIG. 2, the sample pellets are stored in exit ramp section 20 until exit ramp section 21 is in alignment therewith.) The operations described above are continued and repeated for each sample pellet until all the pellets in loading ramp 18 have been introduced into sample holder 17 and analyzed. Sample changer 16 is then deactivated by microswitch 38 which is triggered by piston 28 the first time it penetrates into chamber 25 without engaging a new pellet.

The sample pellet which applicants specially designed for use in their sample changer is shown in FIGS. 5a and 5b. Pellet 47 is comprised of plate 48 which contains sample material or powder 49 in binder 50. Pellet 47 is prepared by filling plate 48 with binder 50, e.g. paraffin, and then embedding sample material 49 by applied pressure. Pellet 47 is finished by applying a coating of clear plastic (not shown) to its exposed surface.

While a specific embodiment of the invention has been presented as required by the Rules of Practice, it is intended that the scope of the invention be limited only by the appended claims after due allowance for equivalents.

What is claimed is:

1. An automatic sample changer for positioning each of a plurality of plate-like pellets in predetermined relation to an X-ray or like analyzer comprising
    (a) a sample holder in which individual pellets are in a vertical plane while they are being analyzed,
    (b) rotatable base means for rotating the sample holder through a predetermined angle relative to the analyzer,
    (c) an inclined loading ramp designed to gravity-feed one pellet at a time to the sample holder, said pellets being stacked edge to edge in the loading ramp,
    (d) a piston adapted to cooperate with the sample holder to align the pellets so that each pellet in turn stands on its edge centered on the axis of rotation of the base means,
    (e) a spring-loaded solenoid adapted to periodically operate the piston to introduce new pellets into the sample holder, and
    (f) an inclined exit ramp designed to receive pellets discharged from the sample holder.

2. An automatic sample changer as set forth in claim 1 where an arm actuated by the solenoid controls the introduction of pellets to the sample holder.

3. An automatic sample changer as set forth in claim 1 where reject means operated by a second spring-loaded solenoid discharges analyzed pellets from the sample holder.

4. An automatic sample changer as set forth in claim 1 where switch means operated by the piston turns off the sample changer after all the pellets have been analyzed.

5. An automatic sample changer for positioning each of a plurality of pellets in predetermined relation to an X-ray or like analyzer comprising
   (a) a sample holder in which individual pellets are held while they are being analyzed, said holder having first and second grooves formed therein interconnected by a chamber, said grooves and chamber being adapted to accommodate the pellets,
   (b) rotatable base means for supporting the sample holder relative to the analyzer, said base means having a flat surface facing one end of the chamber,
   (c) an inclined loading ramp designed to feed one pellet at a time to the sample holder, said ramp being in the form of a spiral chute connecting to the first groove,
   (d) a piston adapted to cooperate with the sample holder to align the pellets so that each pellet in turn is centered on the axis of rotation of the base means, said piston being designed to penetrate into the chamber and hold the pellets against the base means,
   (e) a spring-loaded solenoid adapted to periodically operate the piston to introduce new pellets into the sample holder, said solenoid functioning to withdraw the piston from the chamber after each analysis is concluded, and
   (f) an inclined exit ramp designed to receive pellets discharged from the sample holder, said exit ramp connecting to the second groove.

6. An automatic sample changer as set forth in claim 5 where an arm actuated by the solenoid controls the introduction of pellets to the sample holder.

7. An automatic sample changer as set forth in claim 5 where reject means operated by a second spring-loaded solenoid discharges analyzed pellets from the sample holder.

8. An automatic sample changer as set forth in claim 5 where switch means operated by the piston turns off the sample changer after all the pellets have been analyzed.

References Cited

UNITED STATES PATENTS

| 3,263,078 | 7/1966 | Thackara et al. | 250—51.5 |
| 3,415,987 | 12/1968 | Sahores | 250—51.5 |

ARCHIE R. BORCHELT, Primary Examiner

A. L. BIRCH, Assistant Examiner

U.S. Cl. X.R.

250—49.5